(12) United States Patent
Xu et al.

(10) Patent No.: US 11,296,945 B2
(45) Date of Patent: Apr. 5, 2022

(54) MANAGEMENT METHOD AND APPARATUS

(71) Applicant: Huawei Technologies Co., Ltd., Shenzhen (CN)

(72) Inventors: Ruiyue Xu, Shanghai (CN); Kai Zhang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 46 days.

(21) Appl. No.: 16/151,100

(22) Filed: Oct. 3, 2018

(65) Prior Publication Data
US 2019/0036783 A1 Jan. 31, 2019

Related U.S. Application Data

(63) Continuation of application No. PCT/CN2016/078913, filed on Apr. 8, 2016.

(51) Int. Cl.
*H04L 12/24* (2006.01)
*H04L 41/0893* (2022.01)
(Continued)

(52) U.S. Cl.
CPC ...... *H04L 41/0893* (2013.01); *G06F 9/45558* (2013.01); *H04L 41/0233* (2013.01);
(Continued)

(58) Field of Classification Search
CPC ............ H04L 41/0893; H04L 41/0233; H04L 41/0803; H04L 41/0806; H04L 41/12; G06F 9/45558; G06F 2009/45595
(Continued)

(56) References Cited

U.S. PATENT DOCUMENTS

2011/0246627 A1 10/2011 Kem
2014/0101300 A1 4/2014 Rosensweig et al.
(Continued)

FOREIGN PATENT DOCUMENTS

CN 104137482 A 11/2014
CN 104199718 A 12/2014
(Continued)

OTHER PUBLICATIONS

XP014268729 NFVIFA(16)000087r3 Huawei,"IFA011 7.1 VNFD Affinity Rules descriptions",dated Feb. 6, 2016,total 6 pages.
(Continued)

*Primary Examiner* — Joseph L Greene
(74) *Attorney, Agent, or Firm* — Slater Matsil, LLP

(57) ABSTRACT

A management method and apparatus are provided. The method includes: obtaining, by a second management unit, affinity information. The affinity information is used to configure affinity and/or anti-affinity between a target object and another object, or is used to configure affinity and/or anti-affinity between a child object of the target object and another object. The method further includes sending, by the second management unit, a management request of the target object to a first management unit. The management request carries the affinity information. The method further includes managing, by the first management unit, the target object according to the affinity information, after receiving the management request of the target object and sent by the second management unit.

20 Claims, 8 Drawing Sheets

(51) Int. Cl.
*H04L 41/0806* (2022.01)
*H04L 41/0233* (2022.01)
*G06F 9/455* (2018.01)
*H04L 41/0803* (2022.01)
*H04L 41/12* (2022.01)

(52) U.S. Cl.
CPC ...... *H04L 41/0803* (2013.01); *H04L 41/0806* (2013.01); *H04L 41/12* (2013.01); *G06F 2009/45595* (2013.01)

(58) Field of Classification Search
USPC ......................................................... 709/226
See application file for complete search history.

(56) References Cited

U.S. PATENT DOCUMENTS

| | | | |
|---|---|---|---|
| 2015/0063354 A1 | 3/2015 | Sonoda et al. | |
| 2015/0120931 A1* | 4/2015 | Padala | G06F 9/5077 709/226 |
| 2015/0365352 A1* | 12/2015 | Xiang | H04L 41/0806 709/226 |
| 2016/0057075 A1 | 2/2016 | Parikh et al. | |
| 2017/0031623 A1 | 2/2017 | Gong et al. | |
| 2017/0141944 A1* | 5/2017 | Lee | H04L 67/10 |
| 2017/0289270 A1* | 10/2017 | Li | H04L 41/12 |
| 2017/0371717 A1* | 12/2017 | Kiess | G06F 9/5077 |
| 2018/0316730 A1* | 11/2018 | Schaefer | H04L 41/0883 |
| 2019/0238425 A1* | 8/2019 | Mladin | H04L 41/5048 |
| 2019/0334777 A1* | 10/2019 | Chou | G06F 9/45558 |

FOREIGN PATENT DOCUMENTS

| | | |
|---|---|---|
| EP | 2940968 A1 | 11/2015 |
| JP | 2015515205 A | 5/2015 |
| JP | 2015534696 A | 12/2015 |

OTHER PUBLICATIONS

XP014269925 NFVIFA(16)000087r7 Huawei,"IFA011 7.1 VNFD Affinity Rules descriptions",dated Feb. 6, 2016,total 5 pages.
XP014270291 GS NFV IFA011 V0.5.0 (Mar. 2016),Network Functions Virtualization (NFV); Management and Orchestration;VNF Packaging Specification,ETSI Group Specification, total 58 pages.
3GPP TR 23.802 V0.0.0, 3rd Generation Partnership Project; Technical Specification Group Services and System Aspects; Architectural Enhancements for End-to-EndQuality of Service (QoS), (Release x), Aug. 2004, 8 pages.

* cited by examiner

MANAGEMENT METHOD AND APPARATUS

CROSS-REFERENCE TO RELATED APPLICATIONS

This application is a continuation of International Application No. PCT/CN2016/078913 filed on Apr. 8, 2016, which is hereby incorporated by reference in its entirety.

TECHNICAL FIELD

The present invention relates to the communications field, and in particular, to a management method and apparatus in the technical field of network function virtualization (NFV), such as a management method and apparatus based on affinity information.

BACKGROUND

Based on massive and normalized servers and switches, multiple network functions (such as a virtual operation function, a virtual wide area network function, and a virtual application access router function) are implemented by software in an NFV technology, so as to reduce costs, accelerate service deployment and resource auto scaling, and construct an innovation ecological chain. In the NFV technology, one computer is virtualized into multiple virtual logical computers, e.g., virtual machines (VM). The virtual machine generally performs data communication with the outside of a server by using a server physical network port, a virtual network interface card, and a virtual switch that are used to connect switches within a subrack or top-of-rack switches.

In the NFV technology, multiple types of network devices may be combined into an industry standard by using a virtualization technology in an information technology (IT), for example, a service network device, a switching network device, or a storage network service may be deployed in a data center or on a network node. In the NFV technology, various network functions are implemented by software, the network functions can run on a server of the industrial standard, and the network functions can be migrated, instantiated, re-deployed, or the like according to a requirement, with no need to install a new device. That is, a virtualized network function (VNF) may be generated by using the NFV technology. A network service (NS) may be implemented between multiple VNFs. In practice, a vendor uses a virtualized network function descriptor (VNFD) as a profile for deploying a VNF. A vendor uses a network service descriptor (NSD) as a profile for deploying an NS. One NSD may include multiple VNFDs.

However, effective management of a network service unit or a virtualized network function unit cannot be implemented in an existing solution.

SUMMARY

Embodiments of the present invention provide a management method and apparatus, so as to implement effective management of a network service unit or a virtualized network function unit.

According to one aspect, an embodiment of the present invention provides a management method. The method includes: obtaining, by a second management unit, affinity information. The affinity information is used to configure affinity and/or anti-affinity between a target object and another object, or is used to configure affinity and/or anti-affinity between a child object of the target object and another object. The method further includes sending, by the second management unit, a management request to a first management unit, where the management request carries the affinity information. The method further includes receiving, by the first management unit, the management request sent by the second management unit, and managing the target object according to the affinity information. The first management unit may be configured to manage a virtual resource of the target object. The second management unit may be configured to manage a service of the target object. The target object may be a network service unit or a virtualized network function unit. For example, when the target object is a network service unit, the child object of the target object may be a virtualized network function unit.

After receiving the management request that carries the affinity information, the first management unit can effectively manage the target object according to the affinity information. Further, in the solution in this embodiment of the present invention, affinity and/or anti-affinity between network elements can be implemented in all stages of a management process, for example, the affinity and/or the anti-affinity between the network elements may be implemented in a deployment stage, a maintenance stage, and the like of the management process.

In a possible implementation, the affinity information includes at least one of the following cases.

The affinity information may be affinity deactivation instruction information, where the affinity deactivation instruction information is used to instruct the first management unit to ignore, in a process of managing the target object, a first affinity rule related to the target object. The first affinity rule may be an affinity rule preset in the first management unit. The first affinity rule related to the target object may be ignored in an emergency situation by using the affinity deactivation instruction information, so that a management operation of a first management unit can be simplified, so as to quickly deploy or maintain the target object, and improve management efficiency.

The affinity information may be a second affinity rule, where the second affinity rule includes at least one of rule indication information, an affinity object identifier, or scope indication information. The second affinity rule may be an affinity rule obtained by the second management unit according to a configuration requirement.

The affinity information may be affinity constraint information, where the affinity constraint information is used to indicate a constraint condition of affinity related to the target object and/or a constraint condition of anti-affinity related to the target object. In the solution in this embodiment of the present invention, a network element may be more precisely managed according to a performance requirement or another situation by using the affinity constraint information.

When the affinity information is the second affinity rule, the rule indication information may be used to indicate that the second affinity rule is an affinity rule and/or an anti-affinity rule. The affinity object identifier may be used to identify an action object of the second affinity rule. The affinity object identifier includes at least one of a network service instance identifier, a network service descriptor identifier, a virtualized network function instance identifier, or a virtualized network function descriptor identifier, so that the affinity and the anti-affinity between the network elements are described in multiple manners. The scope indication information may be used to indicate an applicable scope of the second affinity rule, for example, a data center. It may be learned that in the solution in this embodiment of the present invention, the affinity and/or the anti-affinity between the network elements may be described in various manners, so that implementation is more flexible.

In a possible implementation, the first management unit receives the management request sent by the second management unit, and manages the target object according to the affinity information. A management process may include: determining, according to the affinity information, a third affinity rule of management requirement information required for managing the target object. The management process may include deploying the target object according to the third affinity rule of the management requirement information. The management process may include determining a fourth affinity rule of a corresponding virtual resource according to the third affinity rule of the management requirement information; and configuring, according to the fourth affinity rule of the virtual resource, a virtual resource for deploying the target object. In the solution in this embodiment of the present invention, by performing the foregoing process, effective management of a network service or a virtualized network function can be implemented based on the affinity information.

In a possible implementation, the management request further carries a target object descriptor identifier, which is a network service descriptor identifier or a virtualized network function descriptor identifier, so that the first management unit determines, according to the target object descriptor identifier, the management requirement information required for managing the target object.

In a possible implementation, the management request is a lifecycle management request, and lifecycle management for a network service or a virtualized network function may be implemented by using the foregoing method.

According to another aspect, an embodiment of the present invention provides a management apparatus. The apparatus may implement functions performed by the first management unit in the foregoing method embodiment. The functions may be implemented by hardware, or may be implemented by hardware by executing corresponding software. The hardware or software includes one or more corresponding modules of the foregoing functions.

In a possible implementation, a structure of the apparatus includes a processor and a transceiver. The processor is configured to enable the apparatus to perform a corresponding function in the foregoing method. The transceiver is configured to support communication between the apparatus and another network element. The apparatus may further include a memory. The memory is configured to couple to the processor, and stores a necessary program instruction and necessary data that are of the apparatus.

According to still another aspect, an embodiment of the present invention provides a management apparatus. The apparatus may implement functions performed by the second management unit in the foregoing method embodiment. The functions may be implemented by hardware, or may be implemented by hardware by executing corresponding software. The hardware or software includes one or more corresponding modules of the foregoing functions.

In a possible implementation, a structure of the apparatus includes a processor and a transceiver. The processor is configured to enable the apparatus to perform a corresponding function in the foregoing method. The transceiver is configured to support communication between the apparatus and another network element. The apparatus may further include a memory. The memory is configured to couple to the processor, and stores a necessary program instruction and necessary data that are of the apparatus.

According to still another aspect, an embodiment of the present invention provides a communications system. The system includes the apparatus that is in the foregoing aspects and that may implement functions of the first management unit, and the apparatus that is in the foregoing aspects and that may implement functions of the second management unit.

According to yet another aspect, an embodiment of the present invention provides a computer storage medium. The computer storage medium is configured to store a computer software instruction used by the foregoing first management unit, and includes a program designed for executing the foregoing aspects.

According to yet another aspect, an embodiment of the present invention provides a computer storage medium. The computer storage medium is configured to store a computer software instruction used by the foregoing second management unit, and includes a program designed for executing the foregoing aspects.

Compared with current systems, in the solutions provided by embodiments of the present invention, a second management unit obtains affinity information, and sends, to a first management unit, a management request that carries the affinity information; and after receiving the management request sent by the second management unit, the first management unit manages the target object according to the affinity information carried in the management request, so as to implement effective management of a network service unit or a virtualized network function unit. Further, in the solutions provided by embodiments of the present invention, affinity and/or anti-affinity between network elements can be implemented in all management stages, and the affinity and/or the anti-affinity between the network elements are described in multiple manners, so that the affinity and/or the anti-affinity between the network elements can be more flexibly implemented.

BRIEF DESCRIPTION OF THE DRAWINGS

The following briefly describes the accompanying drawings for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following describes the technical solutions of the embodiments of the present invention with reference to the accompanying drawings in the embodiments of the present invention.

A network architecture and a service scenario that are described in an embodiment of the present invention are intended to more clearly describe the technical solutions in the embodiments of the present invention, and shall not be construed as any limitation on the technical solutions provided in the embodiments of the present invention. A person of ordinary skill in the art may learn that the technical solutions provided in the embodiments of the present invention are also applicable to a similar technical problem with evolution of the network architecture and emergence of a new service scenario.

Figure 1:
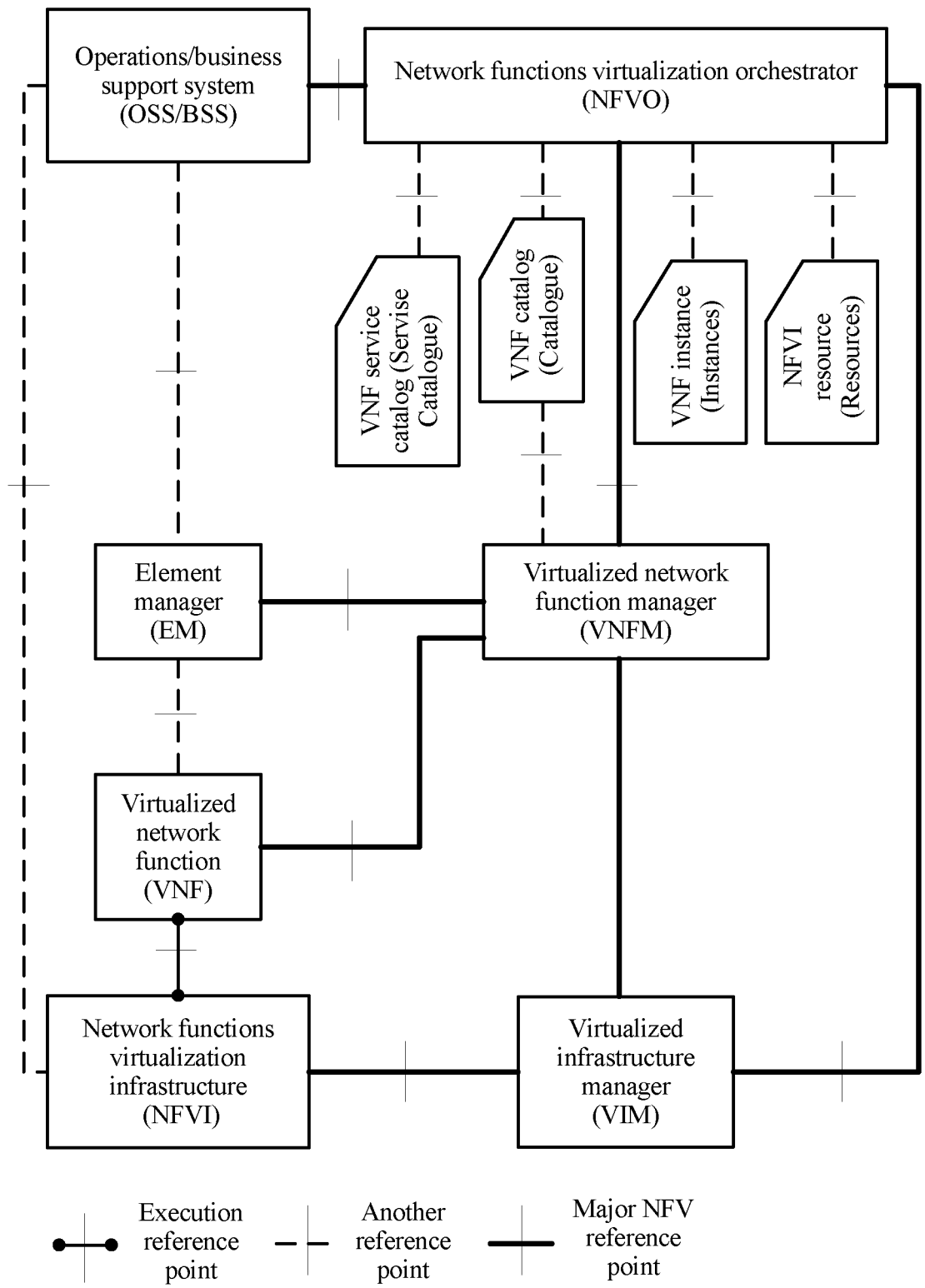
FIG. 1 is a schematic diagram of a possible network architecture according to an embodiment of the present invention.

As shown in FIG. 1, an NFV-based network architecture mainly includes: an operations support system (OSS)/a business support system (BSS), an element manager (EM) unit, a virtualized network function (VNF) unit, a network functions virtualization infrastructure (NFVI) unit, a network functions virtualization orchestrator (NFVO) unit, a virtualized network function manager (VNFM) unit, and a virtualized infrastructure manager (VIM) unit. It should be noted that in the following descriptions, an acronym of each unit may be used for describing a corresponding unit, for example, the element manager unit may be described as an EM or an EM unit. Brief descriptions about the foregoing units are made as follows.

The OSS/BSS is an integration and information resource sharing support system of a telecommunications operator, and mainly includes network management, system management, charging, business, accounting, a consumer service, and the like. Organic integration between systems is implemented by using a uniform information bus. The OSS/BSS can help an operator to formulate an operations support system suitable for features of the operator and help the operator to determine a system development direction, and can further help a subscriber to formulate a system integration standard, so as to improve and enhance a business level of the subscriber. In the NFV-based network architecture, the OSS/BSS is configured to perform necessary modification and adjustment on a lifecycle management (such as instantiation) of each network element.

The EM unit is configured to manage some VNF units.

The NFVI unit is a collective term of all hardware devices and software components in an environment having a capability of deploying network functions virtualization. The NFVI unit may cross several physical sites (for example, data center operating places) to perform extended deployment. In this case, a network providing a data connection for these physical sites may also be considered as a part of the NFVI unit.

The NFVO unit may be configured to: manage an NS lifecycle, orchestrate NS lifecycle management, orchestrate VNF lifecycle management (requiring support from the VNFM), and orchestrate management of all types of resources in the NFVI unit (requiring support from the VIM), so as to ensure optimized configuration of all types of resources and connections that are required. The lifecycle management is management performed for instantiation, maintenance, and termination that are of the VNF unit or the NS unit.

The VNFM unit is responsible for the VNF lifecycle management.

The VIM unit is responsible for controlling and managing a computing resource, a storage resource, and a network resource that are in the NFVI unit. The VIM may be deployed in an infrastructure domain (for example, an NFVI access point/a service providing point) of an infrastructure network operator.

The network architecture shown in FIG. 1 may include a part of a 3rd Generation Partnership Project (3GPP) system and a part of a network functions virtualization management and orchestration (NFV MANO) system. The part of the 3GPP system mainly includes the OSS/BSS and the EM unit that are shown in FIG. 1. The part of the NFV MANO (which may also be referred to as MANO) system mainly includes the NFVO unit, the VNFM unit, and the VIM unit that are shown in FIG. 1. Information exchange may be established between the part of the 3GPP system and the part of the MANO system. There are two communications interfaces between the part of the 3GPP system and the part of the MANO system. One is an interface between the OSS/BSS and the NFVO unit, and this interface may be referred to as an OS-MA-NFVO interface, which is not marked in FIG. 1. The other is an interface between the EM unit and the VNFM unit, and this interface may be referred to as a VE-VNFM-EM interface, which is not marked in FIG. 1. Therefore, the information exchange between the part of the 3GPP system and the part of the MANO system may be implemented by using the two communications interfaces.

Based on foregoing common aspects included in the embodiments of the present invention, the following further describes this embodiment of the present invention in detail.

Based on reliability management, low loss management, or the like, there is affinity and/or anti-affinity between network elements (NE). Generally, if multiple virtual machines may be on one physical machine, it is considered that these virtual machines have affinity. Multiple virtual machines in which every two virtual machines are on different physical machines have anti-affinity. In the NFV technical field, the affinity and the anti-affinity may be extendedly understood as follows. If multiple VNF units may exist in one area (such as a data center), it is considered that there is affinity between these VNF units. If multiple VNF units cannot exist in one area, it is considered that there is anti-affinity between these VNF units. For example, low loss requires that network elements that interact with each other are deployed in one physical area or nearby physical areas, that is, there is affinity between the network elements that interact with each other. For another example, high availability requires that a master network element and a slave network element cannot be deployed in one physical area, that is, there is anti-affinity between the master network element and the slave network element.

In an NE management process, affinity and/or anti-affinity are implemented between NEs. Currently, an NSD or a VNFD includes information used for describing the affinity and/or the anti-affinity between NEs. However, using this information can help implement the affinity and/or the anti-affinity between the NEs only in an NE deployment stage, but cannot help implement the affinity and/or the anti-affinity between the NEs in another management stage. There is no feasible solution in the current system to implement the affinity and/or the anti-affinity between the NEs in all stages in the NE management process.

In a conventional network architecture, a network element is a software and hardware integrated machine. The affinity and/or the anti-affinity between network elements may be implemented inside the 3GPP system. However, in the NFV-based network architecture, software and hardware are separated. Information about a service aspect of a network element is managed by the part of the 3GPP system, and information about a resource aspect of a network element is managed by the part of the MANO system. To implement the affinity and/or the anti-affinity between network elements, exchange of information about the affinity and/or the anti-affinity is established between the part of the 3GPP system and the part of the MANO system. In the NFV-based network architecture, a conventional network element is virtualized into a VNF unit having a corresponding function.

Based on this, the embodiments of the present invention provide a management method, and an apparatus and a system that are based on the method, so as to implement effective management of a network service unit or a virtualized network function unit. In this method, a second management unit sends a management request of a target object to a first management unit. The management request carries affinity information. The affinity information is used to configure affinity and/or anti-affinity between the target object and another object, or the affinity information is used to configure affinity and/or anti-affinity between a child object of the target object and another object. The first management unit manages the target object according to the affinity information. Further, the affinity and/or the anti-affinity between the target object and another object and the affinity and/or the anti-affinity between the child object of the target object and another object may be described in multiple manners, so that affinity and/or anti-affinity between network elements can be more flexibly implemented. The target object may be an NS unit or a VNF unit. For example, when the target object is an NS unit, a child object of the NS is a VNF unit. It should be noted that the first management unit is an end that receives the management request, for example, the first management unit may be the NFVO unit or the VNFM unit in FIG. 1; and the second management unit is an end that sends the management request, for example, the second management unit may be the OSS/BSS or the EM unit in FIG. 1. The first management unit may be configured to manage a virtual resource of the target object. The second management unit may be configured to manage a service of the target object.

The solution in this embodiment of the present invention may be applied to the NFV-based network architecture shown in FIG. 1. Affinity information exchange may be implemented between the part of the 3GPP system and the part of the MANO system by using the solution in this embodiment of the present invention, so as to effectively manage the target object. Further, in the solution provided in this embodiment of the present invention, affinity and/or anti-affinity between different network elements can be implemented in all management stages.

The following describes the solution provided in this embodiment of the present invention with reference to FIG. 2 to FIG. 4A and FIG. 4B.

Figure 2:
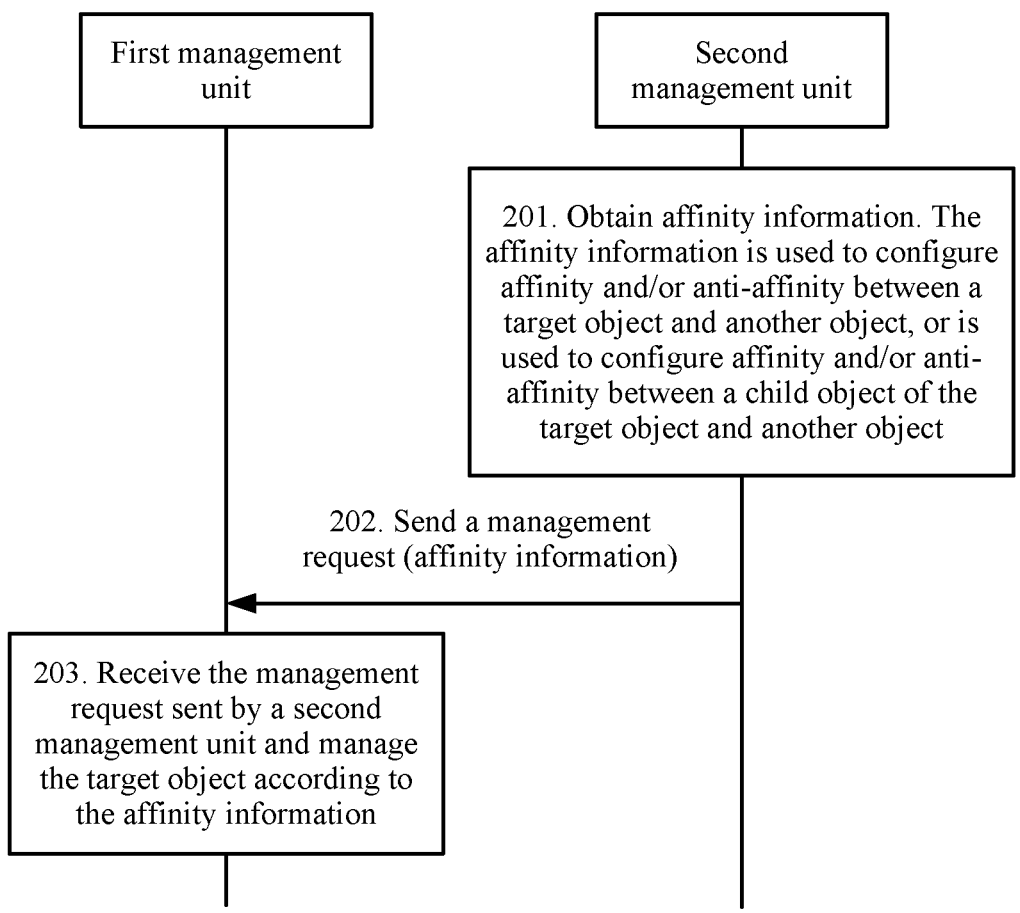
FIG. 2 is a communication schematic diagram of a management method according to an embodiment of the present invention.

FIG. 2 shows a management method based on affinity information according to an embodiment of the present invention. The method shown in FIG. 2 may be applied to the network architecture shown in FIG. 1. The first management unit may be an NFVO unit; the second management unit may be an OSS/a BSS; and the first management unit and the second management unit may communicate by using an OS-MA-NFVO interface. Alternatively, the first management unit may be a VNFM unit; the second management unit may be an EM unit; and the first management unit and the second management unit may communicate by using a VE-VNFM-EM interface.

Step 201: A second management unit obtains affinity information. The affinity information is used to configure affinity and/or anti-affinity between a target object and another object, or is used to configure affinity and/or anti-affinity between a child object of the target object and another object.

It may be understood that a definition of the affinity information herein does not exclude that the affinity information is used to configure affinity and/or anti-affinity between a target object and another object, and is used to configure affinity and/or anti-affinity between a child object of the target object and another object.

In an example, before obtaining the affinity information, the second management unit further determines a target object that needs to be managed. The target object may be an NS unit or a VNF unit. For example, in an NFV-based network architecture, there are multiple NS units and multiple VNF units. The second management unit may determine an NS unit in the multiple NS units as the target object, or may determine a VNF unit in the multiple VNF units as the target object. In a possible implementation, the second management unit may first determine whether the target object is an NS unit or a VNF unit. When determining that the target object is an NS unit, the second management unit further determines an NS unit in the multiple NS units as the target object. Alternatively, when determining that the target object is a VNF unit, the second management unit further determines a VNF unit in the multiple VNF units as the target object. It should be noted that this embodiment of the present invention imposes no limitation on an implementation process in which the second management unit determines the target object that needs to be managed. The implementation process may be determined according to a specific situation, for example, the implementation process may be determined according to a requirement of an application scenario or a 3GPP system.

In an example, the affinity information may include at least one of the following: affinity deactivation instruction information; affinity constraint information, where the affinity constraint information is used to indicate a constraint condition of affinity related to the target object and/or a constraint condition of anti-affinity related to the target object; or a second affinity rule, where the second affinity rule includes at least one of rule indication information, an affinity object identifier, or scope indication information.

In a possible implementation, the affinity information includes the affinity deactivation instruction information. The affinity deactivation instruction information is used to instruct the first management unit to ignore, in a process of managing the target object, a first affinity rule related to the target object. For example, the first affinity rule specifies an object that has affinity and/or anti-affinity with the target object. Ignoring the first affinity rule related to the target object may be understood as ignoring an object that has affinity and/or anti-affinity with the target object. A specific example is used for description in the following: The target object may be a first virtualized network function unit (which may be described as a VNF 1). The first affinity rule related to the target object may be as follows: There is affinity between the VNF 1 and a second virtualized network function unit (which may be described as a VNF 2); and there is anti-affinity between the VNF 1 and a third virtualized network function unit (which may be described as a VNF 3). It is assumed that the VNF 1 becomes faulty because of a special situation such as a natural disaster, and a virtualized network function instance needs to be quickly deployed currently to replace the VNF 1, so as to ensure a service. In this case, the second management unit determines that any affinity and anti-affinity that are related to the VNF 1 do not need to be considered. Therefore, the affinity deactivation instruction information herein may be used to instruct the first management unit to ignore the first affinity rule related to the VNF 1, that is, ignore the affinity between the VNF 1 and the VNF 2, and the anti-affinity between the VNF 1 and the VNF 3. In the solution in this embodiment of the present invention, the first affinity rule related to the target object may be ignored in an emergency situation by using the affinity deactivation instruction information, so that a management operation of the first management element can be simplified, and the target object is quickly deployed or maintained, so as to improve management efficiency. It may be understood that when the affinity information is the deactivation instruction information, the affinity information may instruct the first management unit to configure the first affinity rule to be invalid or to be in a deactivated state.

In a possible implementation, the affinity information includes the affinity constraint information. The affinity constraint information is used to indicate a constraint condition of affinity related to the target object and/or a constraint condition of anti-affinity related to the target object. The constraint condition may be a reliability degree, delay duration, or the like. For example, if the second management unit requires that there is highest reliability between a first virtualized network function instance (which may be described as a VNF instance 1), a second virtualized network function instance (which may be described as a VNF instance 2), a third virtualized network function instance (which may be described as a VNF instance 3), and a fourth virtualized network function instance (which may be described as a VNF instance 4) based on a first virtualized network function descriptor (which may be described as a VNFD 1), the affinity constraint information may be used to indicate that the VNF instance 1, the VNF instance 2, the VNF instance 3, and the VNF instance 4 need to be deployed in different physical areas or data centers as far as possible. In the solution in this embodiment of the present invention, a network element may be more precisely managed according to a performance requirement or another situation by using the affinity constraint information.

In a possible implementation, the affinity information is the second affinity rule. The second affinity rule includes at least one of rule indication information, an affinity object identifier, or scope indication information. The rule indication information may be used to indicate whether the second affinity rule is an affinity rule and/or an anti-affinity rule. The affinity object identifier may be used to indicate an action object of the second affinity rule, for example, this may be understood as: The affinity object identifier may indicate specific objects between which there is affinity and/or anti-affinity; or the affinity object identifier may indicate specific objects that need to be constrained by affinity and/or anti-affinity. The affinity object identifier may include an affinity object instance identifier and/or an affinity object descriptor identifier, for example, the affinity object identifier may include at least one of a network service instance identifier, a network service descriptor identifier, a virtualized network function instance identifier, or a virtualized network function descriptor identifier. It should be noted that the affinity object may be the target object, may be a unit related to the target object, or may be another unit. For example, when the target object is an NS unit, the affinity object may be the NS unit, may be a VNF unit related to the NS unit, or may be another unit. For example, if the target object is an NS unit, the affinity object identifier may include at least one of the network service instance identifier, the network service descriptor identifier, the virtualized network function instance identifier, or the virtualized network function descriptor identifier. For another example, if the target object is a VNF unit, the affinity object identifier includes the virtualized network function instance identifier and/or the virtualized network function descriptor identifier. The scope indication information may be used to indicate an applicable scope of the second affinity rule, for example, the applicable scope may be a physical area or a data center.

Currently, the NSD or the VNFD included in the NSD may be used for describing the affinity and the anti-affinity between the network elements. It may be understood that a VNFD identifier is used to indicate that all VNF instances based on the VNFD are constrained by affinity and anti-affinity, or a virtual link descriptor (VLD) identifier is used to indicate that all VL instances based on the VLD are constrained by affinity and anti-affinity. In the current system, the affinity and/or the anti-affinity can be described only based on a VNFD granularity. This has a limitation to some extent. It may be learned from the foregoing descriptions that in the solution in this embodiment of the present invention, the affinity information may be based on the VNFD granularity or an NSD granularity, or may be based on an NS instance granularity or a VNF instance granularity. Therefore, in the solution in this embodiment of the present invention, the affinity and/or the anti-affinity between network elements may be described in various manners, so that implementation is more flexible.

Step 202: The second management unit sends a management request to a first management unit. The management request carries the affinity information.

The management request may further carry a target object descriptor identifier, for example, the target object descriptor identifier may be the network service descriptor identifier, or the virtualized network function descriptor identifier.

In an example, the second management unit may send the management request to the first management unit by using a communications interface between the first management unit and the second management unit. For example, the communications interface between the first management unit and the second management unit may be the OS-MA-NFVO interface or the VE-VNFM-EM interface.

In an example, the management request may be a lifecycle management request. The lifecycle management request may be used for lifecycle management of the target object; or the management request may be another type of management request.

In an example, alternatively, some or all of the affinity information may be preset in the first management unit. For example, at least one of the affinity deactivation instruction information, the second affinity rule, or the affinity constraint information is preset in the first management unit.

Step 203: The first management unit receives the management request sent by the second management unit, and manages the target object according to the affinity information.

In an example, a process in which the first management unit manages the target object according to the affinity information may include the following four parts:

A first part is as follows: The first management unit determines, according to the affinity information, a third affinity rule of management requirement information for managing the target object. In a possible implementation, the affinity information may include the target object descriptor identifier. The first part may include the following two steps.

(1) The first management unit searches for a target object descriptor according to the target object descriptor identifier, and parses the target object descriptor, so as to determine the management requirement information for managing the target object. If the target object is an NS, the first management unit searches for a corresponding NSD according to an NSD ID of the NS, and parses the NSD. Because each NSD includes multiple VNFDs, a process of parsing the NSD includes analyzing a specific quantity of combinations between a VNFD and a deployment specification in the NSD. Management requirement information for managing the NS is determined according to a parsing result. The management requirement information of the NS includes multiple pieces of VNF instance requirement information. One piece of VNF instance requirement information includes one VNFD ID and a deployment specification corresponding to the VNFD ID. If a target object is a VNF, the first management unit searches for a corresponding VNFD according to a VNFD ID of the VNF, and parses the VNFD, so as to determine VNF instance requirement information.

(2) The first management unit determines the third affinity rule of the management requirement information according to the affinity information. If the target object is an NS, the first management unit determines an affinity rule of each piece of VNF instance requirement information according to a VNFD in each piece of VNF instance requirement information in the multiple pieces of VNF instance requirement information and/or an affinity rule in an NSD corresponding to the NS in an NFV network architecture and/or affinity information, that is, determines an object that has affinity and/or anti-affinity with each piece of VNF instance requirement information. If the target object is a VNF, the first management unit determines an affinity rule of VNF instance requirement information according to a VNFD corresponding to the VNF and/or an affinity rule related to the VNFD in an NSD, that is, determines an object that has affinity and/or anti-affinity with the VNF instance requirement information.

A second part is as follows. The first management unit deploys the target object according to the third affinity rule of the management requirement information. For example, if the target object is an NS, the first management unit deploys or requests VNF instantiation according to an affinity rule of each piece of VNF instance requirement information; or if the target object is a VNF, the first management unit instantiates the VNF according to an affinity rule of VNF instance requirement information.

A third part is as follows. The first management unit determines a fourth affinity rule of a corresponding virtual resource according to the third affinity rule of the management requirement information. For example, the first management unit converts the third affinity rule of the management requirement information into a fourth affinity rule of a corresponding virtual resource; for another example, the first management unit generates a fourth affinity rule of a corresponding virtual resource according to the third affinity rule of the management requirement information; for still another example, the first management unit may search for a fourth affinity rule of a corresponding virtual resource according to the third affinity rule of the management requirement information. The virtual resource may be a computing resource, a network resource, a storage resource, or the like in a virtual machine. It should be noted that one VNF instance may be deployed in multiple virtual machines, or multiple VNF instances may be deployed in one virtual machine. Therefore, when the affinity object is a VNF instance, the converting the third affinity rule of the management requirement information into a fourth affinity rule of a corresponding virtual resource may be understood as converting an affinity rule between affinity objects into an affinity rule between virtual machines in which the VNF instance is stored. For example, if there is anti-affinity between the VNF instance 1 and the VNF instance 2, and the VNF instance 1 is corresponding to a virtual machine VM 1 and the VNF instance 2 is corresponding to a virtual machine VM 2, a third affinity rule between the VNF instance 1 and the VNF instance 2 is converted into a fourth affinity rule between the virtual machine 1 and the virtual machine 2, that is, there is anti-affinity between the virtual machine 1 and the virtual machine 2.

A fourth part is as follows. The first management unit configures, according to the fourth affinity rule of the virtual resource, a virtual resource for deploying the target object. As an example, when the target object is a VNF instance, the configuring a virtual resource for deploying the target object may be understood as determining a specific virtual machine in which an instantiated VNF instance exists and a specific resource that is in the virtual machine and that is to be used. For example, the fourth affinity rule of the virtual resource indicates that there is anti-affinity between the virtual machine 1 and the virtual machine 2, the first management unit separately requests, according to the anti-affinity between the virtual machine 1 and the virtual machine 2, a virtual resource configured for deploying the VNF instance 1 and the VNF instance 2.

In this embodiment of the present invention, a second management unit obtains affinity information, where the affinity information is used to configure affinity and/or anti-affinity between a target object and another object, or is used to configure affinity and/or anti-affinity between a child object of the target object and another object; the second management unit sends, to a first management unit, a management request that carries the affinity information; and the second management unit manages the target object according to the affinity information in the management request, so as to implement effective management of a network service unit or a virtualized network function unit. Further, in the solution in this embodiment of the present invention, affinity and/or anti-affinity between network elements can be implemented in all management stages, and the affinity and/or the anti-affinity between the network elements are described in multiple manners, so that the affinity and/or the anti-affinity between the network elements can be more flexibly implemented.

Figure 3A:
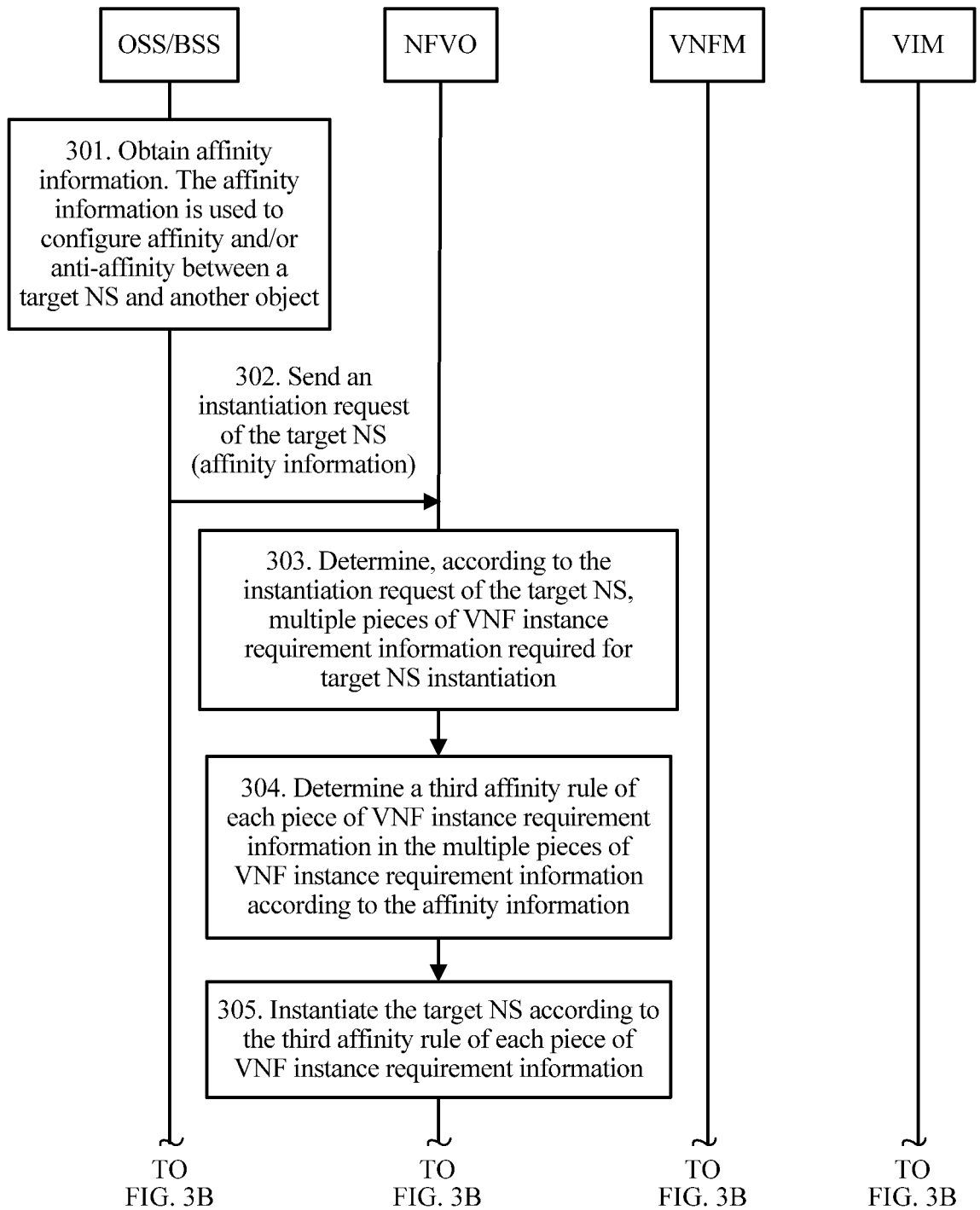
FIG. 3A and FIG. 3B are a communication schematic diagram of another management method according to an embodiment of the present invention.
Figure 3B:
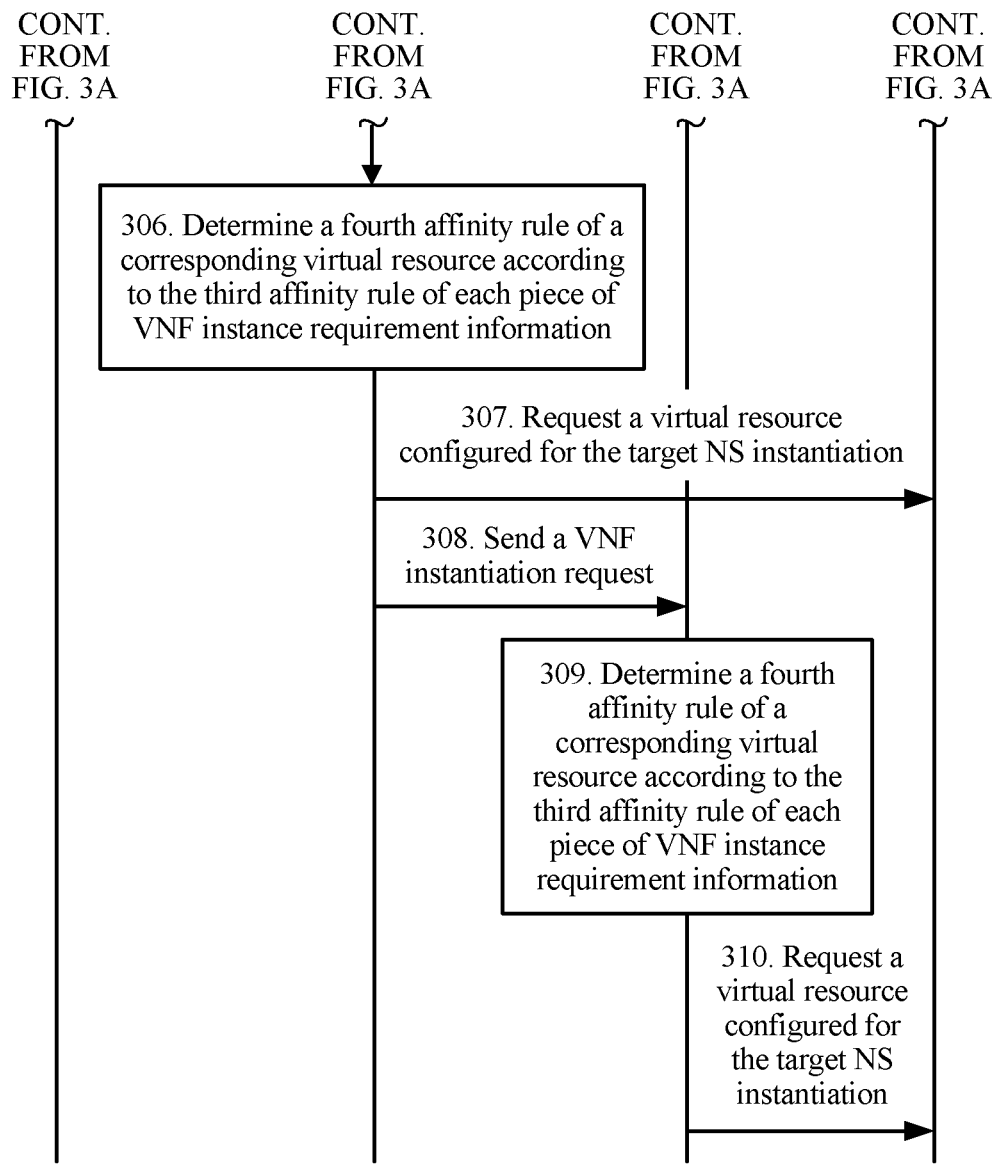

FIG. 3A and FIG. 3B show another management method based on affinity information according to an embodiment of the present invention. In the method shown in FIG. 3A and FIG. 3B, for content same as or similar to the method shown in FIG. 2, refer to related detailed descriptions in FIG. 2. Details are not described herein again. It should be noted that a solution shown in FIG. 3A and FIG. 3B may be applicable to the following application scenario. An OSS/a BSS needs to create an NS instance 2. Based on a service management requirement (such as a service delay or low loss) in this scenario, in the newly-created NS instance 2, an instance based on a second virtualized network function descriptor (which may be described as a VNFD 2) and an existing first virtualized network function instance (which may be described as a VNF instance 1) need to be in one physical area. A prerequisite for implementing this embodiment of the present invention is as follows. An NSD and a related VNFD that are used to create the NS instance 2 are sent to an NFVO by the OSS/BSS, and the NFVO uploads the NSD and the related VNFD to a corresponding catalog. The management method based on affinity information is described in this embodiment of the present invention based on NS instantiation in NS lifecycle management, and other NS lifecycle management is similar to that in this embodiment. The following describes the method shown in FIG. 3A and FIG. 3B.

Step 301: An OSS/a BSS obtains affinity information. The affinity information is used to configure affinity and/or anti-affinity between a target NS and another object.

In an example, the affinity information may be further used to configure affinity and/or anti-affinity between a child object VNF unit of the target NS and another object.

In an example, based on consideration of a requirement, the OSS/BSS needs to instantiate an NS, and uses the NS as the target NS. The OSS/BSS obtains and determines the affinity information used to configure the affinity and/or the anti-affinity between the target NS and another object, or determines the affinity information used to configure the affinity and/or the anti-affinity between the child object VNF unit of the target NS and another object. In this embodiment of the present invention, the OSS/BSS obtains and determines affinity information required for target NS instantiation.

In an example, the affinity information may include at least one of the following: affinity deactivation instruction information; affinity constraint information, where the affinity constraint information is used to indicate a constraint condition of affinity related to the target object and/or a constraint condition of anti-affinity related to the target object; or a second affinity rule, where the second affinity rule includes at least one of rule indication information, an affinity object identifier, or scope indication information. For a detailed description of the affinity deactivation instruction information, the affinity constraint information, or the second affinity rule, refer to a corresponding description in the method shown in FIG. 2. Details are not described herein again.

Step 302: The OSS/BSS sends an instantiation request of the target NS to an NFVO. The instantiation request carries the affinity information.

The instantiation request may further carry a target NS descriptor identifier, that is, an NSD ID.

In an example, on a premise that the affinity information is determined, the OSS/BSS sends the instantiation request of the target NS to the NFVO by using an OS-Ma-nfvo interface between the OSS/BSS and the NFVO.

In an example, alternatively, some or all of the affinity information may be preset in the NFVO. For example, at least one of the affinity deactivation instruction information, the second affinity rule, or the affinity constraint information is preset in the NFVO.

Step 303: The NFVO determines, according to the instantiation request of the target NS, multiple pieces of VNF instance requirement information required for target NS instantiation.

In an example, the NFVO receives the instantiation request of the target NS, and determines, according to the target NSD ID, multiple pieces of VNF instance requirement information required for the target NS instantiation. The NFVO searches a network for a target NSD according to the target NSD ID, and parses the target NSD, so as to analyze the multiple pieces of VNF instance requirement information in the target NSD. One piece of VNF instance requirement information includes one VNFD ID and a deployment specification corresponding to the VNFD ID. The NFVO or a VNFM may instantiate a VNF according to a piece of VNF instance requirement information.

Step 304: The NFVO determines a third affinity rule of each piece of VNF instance requirement information in the multiple pieces of VNF instance requirement information according to the affinity information.

In an example, if the affinity information is the affinity deactivation instruction information, the NFVO determines the third affinity rule of each piece of VNF instance requirement information in the multiple pieces of VNF instance requirement information according to the affinity deactivation instruction information.

If the affinity information is the affinity constraint information, the NFVO parses the affinity constraint information, and determines the third affinity rule of each piece of VNF instance requirement information in the multiple pieces of VNF instance requirement information according to the affinity constraint information.

If the affinity information is the second affinity rule, the NFVO determines the third affinity rule of each piece of VNF instance requirement information according to a VNFD in each piece of VNF instance requirement information in the multiple pieces of VNF instance requirement information and/or a first affinity rule related to the target NS in an NFV network architecture and/or the second affinity rule. The NFVO checks whether there is affinity and/or anti-affinity of a piece of VNF instance requirement information in the first affinity rule, and if there is affinity and/or anti-affinity of a piece of VNF instance requirement information in the first affinity rule, determines the affinity and/or the anti-affinity of the VNF instance requirement information according to the first affinity rule; or if there is no affinity and/or anti-affinity of a piece of VNF instance requirement information in the first affinity rule, searches for and determines the affinity and/or the anti-affinity of the VNF instance requirement information in the second affinity rule. If the affinity and/or the anti-affinity of the VNF instance requirement information cannot be determined by using either the first affinity rule or the second affinity rule, the NFVO determines the third affinity rule of the VNF instance requirement information according to a VNFD corresponding to the VNF instance requirement information. If a third affinity rule that is of a piece of VNF instance requirement information and that is determined according to the first affinity rule is in conflict with a third affinity rule that is of the VNF instance requirement information and that is determined according to the second affinity rule, the third affinity rule that is of the VNF instance requirement information and that is determined according to the second affinity rule is first considered, or the OSS/BSS is requested to determine a specific affinity rule that is to be used.

Step 305: The NFVO instantiates the target NS according to the third affinity rule of each piece of VNF instance requirement information.

In an example, when the third affinity rule of each piece of VNF instance requirement information is determined, the NFVO instantiates the target NS according to the third affinity rule of each piece of VNF instance requirement information.

Step 306: The NFVO determines a fourth affinity rule of a corresponding virtual resource according to the third affinity rule of each piece of VNF instance requirement information.

In an example, the NFVO determines the fourth affinity rule of the corresponding virtual resource according to the third affinity rule of each piece of VNF instance requirement information, for example, the NFVO converts the third affinity rule of each piece of VNF instance requirement information into a fourth affinity rule of a corresponding virtual resource; for another example, the NFVO generates a fourth affinity rule of a corresponding virtual resource according to the third affinity rule of each piece of VNF instance requirement information; for still another example, the NFVO searches for the fourth affinity rule of the corresponding virtual resource according to the third affinity rule of each piece of VNF instance requirement information. The virtual resource may be a computing resource, a network resource, a storage resource, or the like in a virtual machine. It should be noted that one VNF instance may be deployed in multiple virtual machines, or multiple VNF instances may be deployed in one virtual machine. The converting the third affinity rule into the fourth affinity rule of the corresponding virtual resource is converting the third affinity rule into an affinity rule between virtual machines.

Step 307: The NFVO requests a VIM to configure a virtual resource for the target NS instantiation.

In an example, the NFVO requests, according to the fourth affinity rule of the virtual resource and the VNFD corresponding to each piece of VNF instance requirement information, the VIM to configure a virtual resource for the target NS instantiation, that is, requests the VIM to allocate a virtual machine to an instantiated VNF instance.

Step 308: The NFVO sends a VNF instantiation request to a VNFM. The VNF instantiation request includes a VNFD ID corresponding to each piece of VNF instance requirement information and a third affinity rule of each piece of VNF instance requirement information.

In an example, the NFVO sends the VNF instantiation request to the VNFM, and the VNFM generates multiple VNF instances by means of instantiation according to the VNF instantiation request, so as to implement the target NS instantiation. The VNF instantiation request includes a VNFD ID corresponding to each piece of VNF instance requirement information and the fourth affinity rule of each piece of VNF instance requirement information.

Step 309: The VNFM determines a fourth affinity rule of a corresponding virtual resource according to the third affinity rule of each piece of VNF instance requirement information.

In an example, the VNFM receives the VNF instantiation request sent by the NFVO, and instantiates a VNF according to the affinity rule of each piece of VNF instance requirement information, so as to generate multiple VNF instances by means of instantiation. In a process of performing the VNF instantiation, the VNFM determines the fourth affinity rule of the corresponding virtual resource according to the third affinity rule of each piece of VNF instance requirement information, that is, determines an affinity rule between virtual machines.

Step 310: The VNFM requests a virtual resource configured for the target NS instantiation.

In an example, the VNFM sends a request to the VIM according to the fourth affinity rule of the virtual resource and the VNFD corresponding to each piece of VNF instance requirement information, so as to request a virtual resource configured for the target NS instantiation, that is, requests the VIM to allocate a virtual machine to an instantiated VNF instance.

It should be noted that parts 306 and 307, and parts 308 to 310 are two parallel solutions, and only one of the two needs to be performed, that is, parts 306 and 307, or parts 308 to 310 are performed. A solution that is specifically to be performed is determined by the NFVO. This is not limited herein.

In this embodiment of the present invention, in an example of an NS instantiation process, affinity information is transmitted by using a communications interface between an OSS/a BSS and an NFVO, so as to implement effective management of a network service unit. Further, in the solution in this embodiment of the present invention, affinity and/or anti-affinity between network elements can be implemented both in a deployment stage and a maintenance stage, and affinity information based on a VNF instance granularity, an NS instance granularity, a VNF instance group granularity, a VNFD granularity, or an NSD granularity may be transmitted by using the communications interface, so that the affinity and/or the anti-affinity between the network elements can be more flexibly implemented.

Figure 4A:
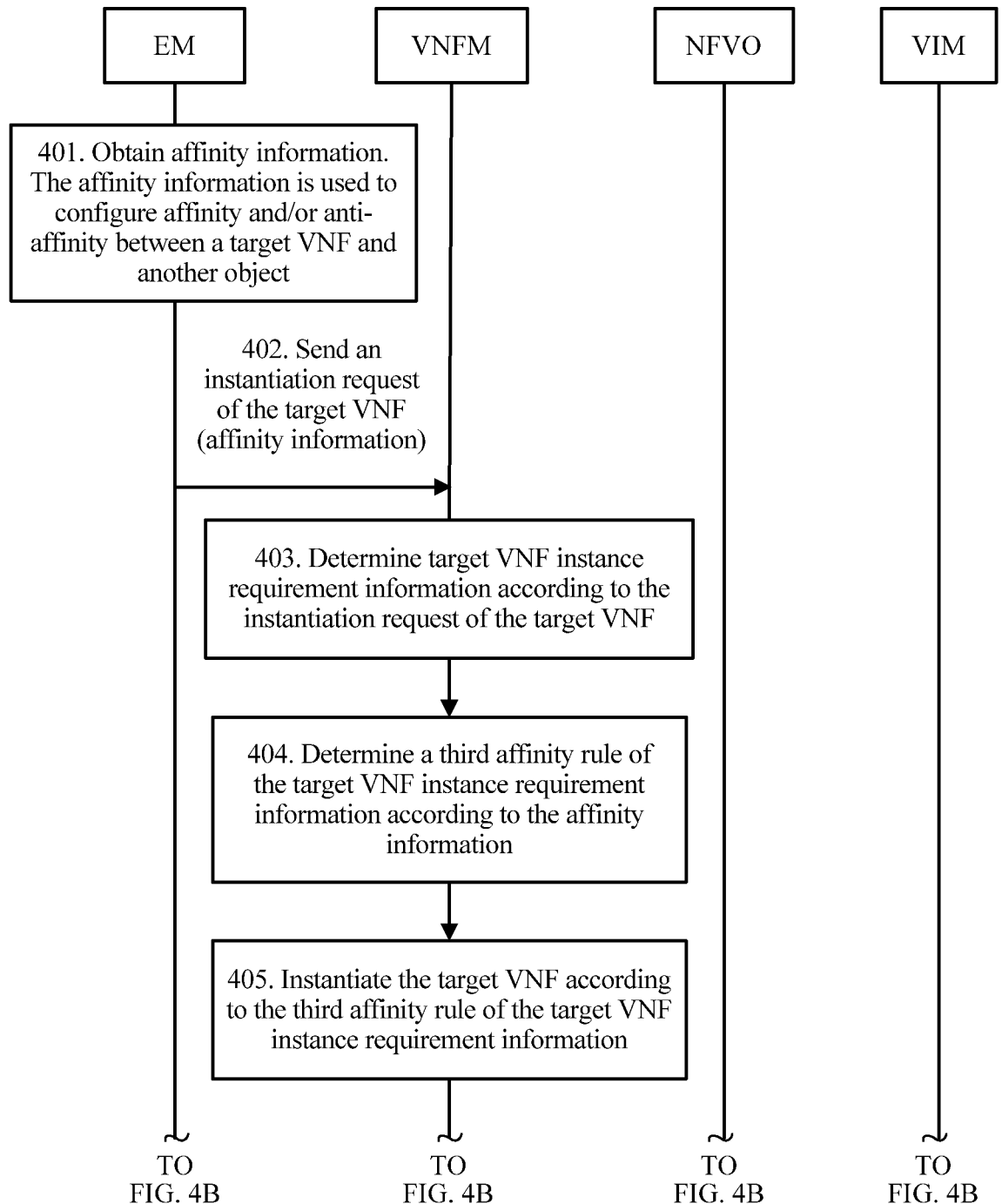
FIG. 4A and FIG. 4B are a communication schematic diagram of still another management method according to an embodiment of the present invention.
Figure 4B:
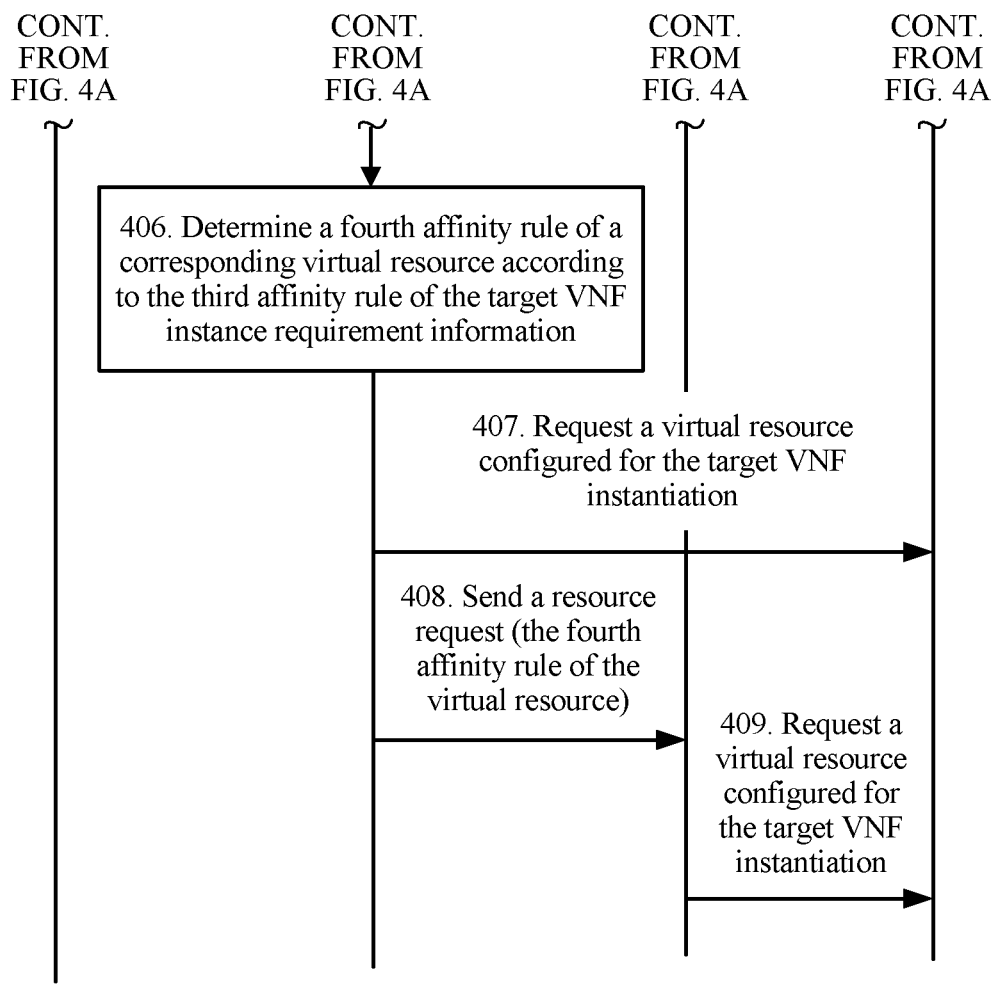

FIG. 4A and FIG. 4B shows still another management method based on affinity information according to an embodiment of the present invention. In the method shown in FIG. FIG. 4A and FIG. 4B, for content same as or similar to the method shown in FIG. 2 or FIG. 3A and FIG. 3B, refer to related detailed descriptions in FIG. 2 or FIG. 3A and FIG. 3B. Details are not described herein again. It should be noted that a solution shown in FIG. 4A and FIG. 4B may be applicable to the following application scenario. An EM needs to create a VNF instance. Based on a service management requirement (such as reliability) in this scenario, the newly-created VNF instance and an existing first virtualized network function instance (which may be described as a VNF instance 1) need to be in different physical areas. A prerequisite for implementing this embodiment of the present invention is as follows. A corresponding VNFD used to implement the VNF instance is sent to an NFVO by an OSS/a BSS, and the NFVO uploads the VNFD to a corresponding catalog. The management method based on affinity information is described in this embodiment of the present invention based on VNF instantiation in VNF lifecycle management, and other VNF lifecycle management is similar to that in this embodiment. The following describes the method shown in FIG. 4A and FIG. 4B.

Step 401: An EM obtains affinity information. The affinity information is used to configure affinity and/or anti-affinity between a target VNF and another object.

In an example, based on consideration of a requirement, the EM instantiates a VNF, and uses the VNF as the target VNF. The EM obtains and determines the affinity information used to configure the affinity and/or the anti-affinity between the target VNF and another object. In this embodiment of the present invention, the EM obtains and determines affinity information required for target VNF instantiation.

In an example, the affinity information may include at least one of the following: affinity deactivation instruction information; affinity constraint information, where the affinity constraint information is used to indicate a constraint condition of affinity related to the target VNF and/or a constraint condition of anti-affinity related to the target VNF; or a second affinity rule, where the second affinity rule includes at least one of rule indication information, an affinity object identifier, or scope indication information. For a detailed description of the affinity deactivation instruction information, the affinity constraint information, or the second affinity rule, refer to a corresponding description in the method shown in FIG. 2. Details are not described herein again.

Step 402: The EM sends an instantiation request of the target VNF to a VNFM. The instantiation request carries the affinity information.

The instantiation request may further carry a target VNF descriptor identifier, that is, a VNFD ID.

In an example, on a premise that the affinity information is determined, the EM sends the instantiation request of the target VNF to the VNFM by using a VE-VNFM-EM interface between the EM and the VNFM.

In an example, alternatively, some or all of the affinity information may be preset in the VNFM. For example, at least one of the affinity deactivation instruction information, the second affinity rule, or the affinity constraint information is preset in the VNFM.

Step 403: The VNFM determines target VNF instance requirement information according to the instantiation request of the target VNF.

In an example, the VNFM receives the instantiation request of the target VNF, and determines the target VNF instance requirement information according to the target VNFD ID. The VNFM searches a network for a target VNFD according to the target VNFD ID, and parses the target VNFD. In addition, the VNFM searches for a corresponding target NSD according to the target VNFD, and searches for a first affinity rule that is in the target NSD and that is related to the target VNF. The VNFM sends a query request to the NFVO, so as to request the NFVO to search for the first affinity rule that is in the target NSD and that is related to the target VNF.

Step 404: The VNFM determines a third affinity rule of the target VNF instance requirement information according to the affinity information.

In an example, if the affinity information is the affinity deactivation instruction information, the VNFM determines the third affinity rule of the target VNF instance requirement information according to the affinity deactivation instruction information.

If the affinity information is the affinity constraint information, the VNFM parses the affinity constraint information, and determines the third affinity rule of the target VNF instance requirement information according to the affinity constraint information.

If the affinity information is the second affinity rule, the VNFM determines the third affinity rule of the target VNF instance requirement information according to the target VNFD and/or the first affinity rule that is in the target NSD and that is related to the target VNF and/or the second affinity rule. The VNFM determines whether there is affinity and/or anti-affinity of the target VNF instance requirement information in the first affinity rule that is in the target NSD and that is related to the target VNF, and if there is affinity and/or anti-affinity of the target VNF instance requirement information in the first affinity rule, determines the affinity and/or the anti-affinity of the target VNF instance requirement information according to the first affinity rule; or if there is no affinity and/or anti-affinity of the target VNF instance requirement information in the first affinity rule, searches for and determines the affinity and/or the anti-affinity of the target VNF instance requirement information in the second affinity rule. If the affinity and/or the anti-affinity of the target VNF instance requirement information cannot be determined by using either the first affinity rule or the second affinity rule, the VNFM determines the third affinity rule of the target VNF instance requirement information according to the target VNFD. If a third affinity rule that is of the target VNF instance requirement information and that is determined according to the first affinity rule is in conflict with a third affinity rule that is of the target VNF instance requirement information and that is determined according to the second affinity rule, the third affinity rule that is of the target VNF instance requirement information and that is determined according to the second affinity rule is first considered, or the OSS/BSS is requested to determine a specific affinity rule that is to be used.

Step 405: The VNFM instantiates the target VNF according to the third affinity rule of the target VNF instance requirement information.

In an example, when the third affinity rule of the target VNF instance requirement information is determined, the VNFM instantiates the target VNF according to the third affinity rule of the target VNF instance requirement information, so as to instantiate a target VNF instance.

Step 406: The VNFM determines a fourth affinity rule of a corresponding virtual resource according to the third affinity rule of the target VNF instance requirement information.

In an example, the VNFM determines the fourth affinity rule of the corresponding virtual resource according to the third affinity rule of the target VNF instance requirement information, for example, the VNFM converts the third affinity rule of the target VNF instance requirement information into the fourth affinity rule of the corresponding virtual resource; for another example, the VNFM searches for the fourth affinity rule of the corresponding virtual resource according to the third affinity rule of the target VNF instance requirement information. The virtual resource may be a computing resource, a network resource, a storage resource, or the like in a virtual machine. It should be noted that one VNF instance may be deployed in multiple virtual machines, or multiple VNF instances may be deployed in one virtual machine. The converting the third affinity rule into the fourth affinity rule of the corresponding virtual resource is converting the third affinity rule into an affinity rule between virtual machines.

Step 407: The VNFM requests a virtual resource configured for target VNF instantiation.

In an example, the VNFM sends a request to the VIM according to the fourth affinity rule of the virtual resource and the target VNFD, so as to request a virtual resource configured for the target VNF instantiation, that is, requests the VIM to allocate a virtual machine to an instantiated target VNF instance.

Step 408: The VNFM sends a resource request to an NFVO. The resource request includes the fourth affinity rule of the virtual resource.

In an example, the VNFM sends the resource request to the NFVO. The resource request includes the fourth affinity rule of the virtual resource. In this step, the VNFM requests, by using the NFVO, the VIM to configure a virtual resource, instead of directly requesting the VIM to configure a virtual resource.

Step 409: The NFVO requests, according to the resource request, a VIM to configure a virtual resource for the target VNF instantiation.

In an example, the NFVO receives the resource request sent by the VNFM, and requests, according to the fourth affinity rule that is of a virtual resource and that is in the resource request, the VIM to configure a virtual resource for the target VNF instantiation, that is, requests the VIM to allocate a virtual machine to an instantiated target VNF instance.

It should be noted that parts 406 and 407, and parts 406, 408, and 409 are two parallel solutions, and only one of the two needs to be performed, that is, parts 406 and 407, or parts 406, 408, and 409 are performed. A solution that is specifically to be performed is determined by the VNFM. This is not limited herein.

In this embodiment of the present invention, in an example of a VNF instantiation process, affinity information is transmitted by using a communications interface between an EM and a VNFM, so as to implement effective management of a virtualized network function unit. Further, in the solution in this embodiment of the present invention, affinity and/or anti-affinity between network elements can be implemented both in a deployment stage and a maintenance stage, and affinity information based on a VNF instance granularity, a VNF instance group granularity, or a VNFD granularity may be transmitted by using the communications interface, so that the affinity and/or the anti-affinity between the network elements can be more flexibly implemented.

The foregoing mainly describes the solutions in this embodiment of the present invention from a perspective of interaction between network elements. It may be understood that, to implement the foregoing functions, each network element, such as the first management unit or the second management unit, includes corresponding hardware structures and/or software modules used to perform various functions. A person skilled in the art should be readily aware that, in combination with the examples described in the embodiments disclosed in this specification, units and algorithm steps can be implemented in the present invention in a form of hardware or a combination of hardware and computer software. Whether a function is performed by hardware or by computer software by driving hardware depends on particular applications and design constraint conditions of the technical solutions. A person skilled in the art may use different methods to implement the described functions for each particular application, but it should not be considered that the implementation goes beyond the scope of the present invention.

In this embodiment of the present invention, function module division may be performed on the first management unit, the second management unit, and the like according to the foregoing method examples, for example, function modules may be divided according to functions, or two or more functions may be integrated into one processing module. The integrated module may be implemented in a form of hardware, or may be implemented in a form of a software function module. It should be noted that the module division in this embodiment of the present invention is an example, and is merely logical function division. There may be another division manner in an actual implementation.

Figure 5A:
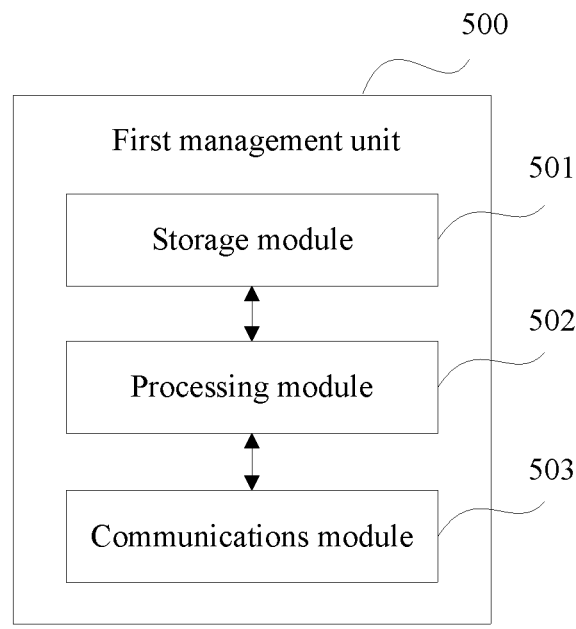
FIG. 5A is a schematic structural diagram of a first management unit according to an embodiment of the present invention.

When the integrated module is used, FIG. 5A shows a possible schematic structural diagram of the first management unit in the foregoing embodiments. A first management unit 500 includes: a processing module 502 and a communications module 503. The processing module 502 is configured to control and manage an action of the first management unit, for example, the processing module 502 is configured to enable the first management unit to perform the process 203 in FIG. 2, the processes 303, 304, 305, 306, 307, and 308 in FIG. 3A and FIG. 3B, and the processes 403, 404, 405, 406, 407, and 408 in FIG. 4A and FIG. 4B, and/or is configured to perform another process of the technology described in this specification. The communications module 503 is configured to support communication between the first management unit and a second management unit or another network entity, such as communication with the NFVO unit or the VNFM unit shown in FIG. 1. The first management unit may further include a storage module 501.

The storage module 501 is configured to store program code and data that are of the first management unit.

The processing module 502 may be a processor or a controller, for example, the processing module 502 may be a central processing unit (CPU), a general purpose processor, a digital signal processor (DSP), an application-specific integrated circuit (ASIC), a field programmable gate array (FPGA), or another programmable logical device, a transistor logic device, a hardware component, or any combination thereof. The processing module 502 may implement or execute various logical blocks, modules, and circuits in combination with the examples described in content disclosed in the present invention. Alternatively, the processor may be a combination used to implement a computing function, for example, a combination including one or more microprocessors, a combination of a DSP and a microprocessor, or the like. The communications module 503 may be a transceiver, a transceiver circuit, or a communications interface, for example, the communications module 503 may be the OS-Ma-nfvo interface or the Ve-Vnfm-em interface in the foregoing descriptions. The storage module 501 may be a memory.

Figure 5B:
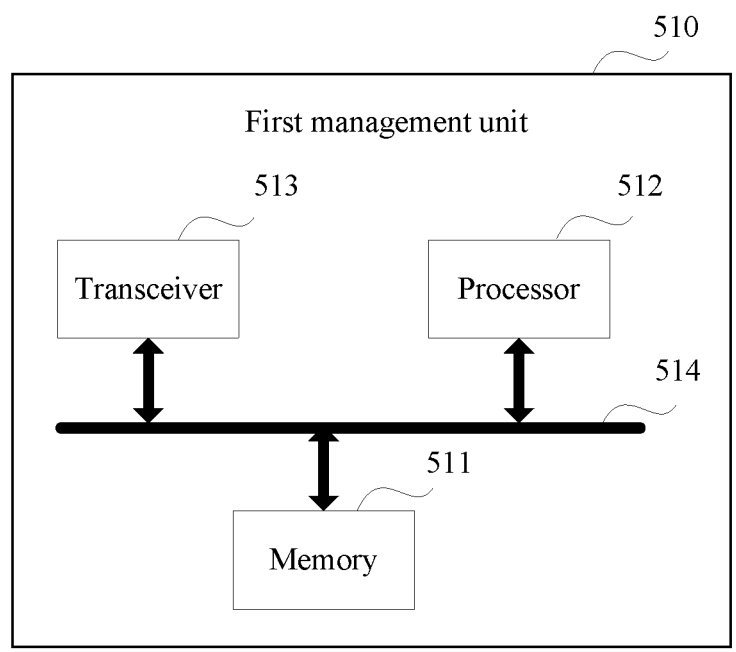
FIG. 5B is a schematic structural diagram of another first management unit according to an embodiment of the present invention.

When the processing module 502 is a processor, the communications module 503 is a transceiver, and the storage module 501 is a memory, the first management unit in this embodiment of the present invention may be a first management unit shown in FIG. 5B.

Referring to FIG. 5B, the first management unit 510 includes: a processor 512, a transceiver 513, and a memory 511. Optionally, the first management unit 510 may further include a bus 514. The transceiver 513, the processor 512, and the memory 511 may be connected to each other by using the bus 514. The bus 514 may be a peripheral component interconnect (PCI) bus, or an extended industry standard architecture (EISA) bus, or the like. The bus 514 may be classified into an address bus, a data bus, a control bus, and the like. For ease of representation, only one thick line is used to represent the bus in FIG. 5B, but this does not mean that there is only one bus or only one type of buses.

Figure 6A:
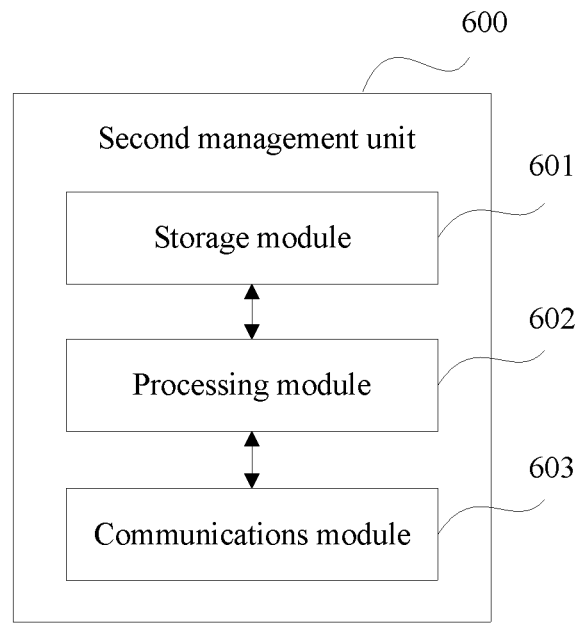
FIG. 6A is a schematic structural diagram of a second management unit according to an embodiment of the present invention.

When the integrated module is used, FIG. 6A shows a possible schematic structural diagram of the second management unit in the foregoing embodiments. A second management unit 600 includes: a processing module 602 and a communications module 603. The processing module 602 is configured to control and manage an action of the second management unit, for example, the processing module 602 is configured to enable the second management unit to perform the processes 201 and 202 in FIG. 2, the processes 301 and 302 in FIG. 3A and FIG. 3B, and the processes 401 and 402 in FIG. 4A and FIG. 4B, and/or is configured to perform another process of the technology described in this specification. The communications module 603 is configured to support communication between the second management unit and a first management unit or another network entity, such as communication with the OSS/BSS unit or the EM unit shown in FIG. 1. The second management unit may further include a storage module 601. The storage module 601 is configured to store program code and data that are of the second management unit.

The processing module 602 may be a processor or a controller, for example, the processing module 602 may be a central processing unit (CPU), a general purpose processor, a digital signal processor (DSP), an application-specific integrated circuit (ASIC), a field programmable gate array (FPGA), or another programmable logical device, a transistor logic device, a hardware component, or any combination thereof. The processing module 602 may implement or execute various logical blocks, modules, and circuits in combination with the examples described in content disclosed in the present invention. Alternatively, the processor may be a combination used to implement a computing function, for example, a combination including one or more microprocessors, a combination of a DSP and a microprocessor, or the like. The communications module 603 may be a transceiver, a transceiver circuit, or a communications interface, for example, the communications module 603 may be the OS-Ma-nfvo interface or the Ve-Vnfm-em interface in the foregoing descriptions. The storage module 601 may be a memory.

Figure 6B:
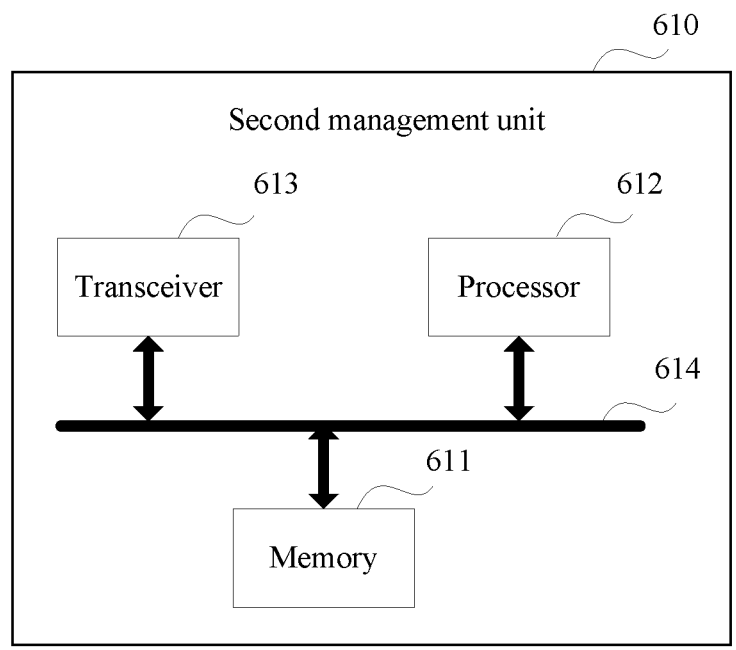
FIG. 6B is a schematic structural diagram of another second management unit according to an embodiment of the present invention.

When the processing module 602 is a processor, the communications module 603 is a transceiver, and the storage module 601 is a memory, the first management unit in this embodiment of the present invention may be a second management unit shown in FIG. 6B.

Referring to FIG. 6B, the first management unit 610 includes: a processor 612, a transceiver 613, and a memory 611. Optionally, the first management unit 610 may further include a bus 614. The transceiver 613, the processor 612, and the memory 611 may be connected to each other by using the bus 614. The bus 614 may be a peripheral component interconnect bus, or an extended industry standard architecture bus, or the like. The bus 614 may be classified into an address bus, a data bus, a control bus, and the like. For ease of representation, only one thick line is used to represent the bus in FIG. 6B, but this does not mean that there is only one bus or only one type of buses.

Methods or algorithm steps described in combination with the content disclosed in this embodiment of the present invention may be implemented by hardware, or may be implemented by a processor by executing a software instruction. The software instruction may include a corresponding software module. The software module may be stored in a random access memory (RAM), a flash memory, a read-only memory (OM), an erasable programmable read only memory (EPROM), an electrically erasable programmable read only memory (EEPROM), a register, a hard disk, a mobile hard disk, a compact disc read-only memory (CD-ROM), or any other form of storage medium well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in a core network interface device. Certainly, alternatively, the processor and the storage medium may exist in a core network interface device as discrete components.

A person skilled in the art should be aware that in the foregoing one or more examples, functions described in the embodiments of the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A method, comprising:
   receiving, by a network functions virtualization orchestrator (NFVO) device from an operations support system or business support system (OSS/BSS), an instantiation request of a network service (NS), wherein the instantiation request comprises affinity information indicating affinity or anti-affinity between a virtualized network function (VNF) instance of the NS and an existing VNF instance, wherein the affinity information has a VNF instance granularity, wherein the affinity information is associated with an identifier of the existing VNF instance and an identifier of a virtualized network function descriptor (VNFD), and wherein the VNF instance of the NS is instantiated according to the VNFD;
   determining, by the NFVO, a target network service descriptor (NSD) according to a target NSD identifier (NSD ID) associated with the instantiation request;
   determining, by the NFVO, multiple pieces of VNF instance requirement information required for instantiation of the VNF instance by parsing the target NSD, wherein at least one piece of VNF instance requirement information comprises one VNFD identifier (VNFD ID) and a deployment specification corresponding to the VNFD ID;
   determining a first affinity rule for each piece of VNF instance requirement information of the multiple pieces of VNF instance requirement information according to the affinity information; and
   instantiating, by the NFVO device, the NS according to the first affinity rule for each piece of VNF instance requirement information.

2. The method according to claim 1, wherein: the affinity information is a second affinity rule, wherein the second affinity rule comprises at least one of rule indication information, an affinity object identifier, or scope indication information.

3. The method according to claim 2, wherein the rule indication information indicates that the second affinity rule is an affinity rule or an anti-affinity rule.

4. The method according to claim 2, wherein the affinity object identifier identifies an action object of the second affinity rule, and the affinity object identifier comprises the identifier of the existing VNF instance and the identifier of the VNFD.

5. The method according to claim 2, wherein the scope indication information indicates an applicable scope of the second affinity rule.

6. A method, comprising:
   obtaining, by an operations support system or business support system (OSS/BSS), affinity information, wherein the affinity information indicates affinity or anti-affinity between a virtualized network function (VNF) instance of a network service (NS) and an existing VNF instance, wherein the affinity information has a VNF instance granularity, wherein the affinity information is associated with an identifier of the existing VNF instance and an identifier of a virtualized network function descriptor (VNFD), and wherein the VNF instance of the NS is instantiated according to the VNFD; and sending, by the OSS/BSS, an instantiation request of the NS to a network functions virtualization orchestrator (NFVO) device, wherein the instantiation request comprises the affinity information, wherein sending the instantiation request causes the NFVO device to:

determine a target network service descriptor (NSD) according to a target NSD identifier (NSD ID) associated with the instantiation request, to determining, by the NFVO, multiple pieces of VNF instance requirement information required for instantiation of the VNF instance by parsing the target NSD, wherein at least one piece of VNF instance requirement information comprises one VNFD identifier (VNFD ID) and a deployment specification corresponding to the VNFD ID;

determine a first affinity rule for each piece of VNF instance requirement information of the multiple pieces of VNF instance requirement information according to the affinity information; and instantiate the NS according to the first affinity rule for each piece of VNF instance requirement information.

7. The method according to claim 6, wherein: the affinity information is a second affinity rule, wherein the second affinity rule comprises at least one of rule indication information, an affinity object identifier, or scope indication information.

8. The method according to claim 7, wherein the affinity object identifier identifies an action object of the second affinity rule, and the affinity object identifier comprises the identifier of the existing VNF instance and the identifier of the VNFD.

9. The method according to claim 7, wherein the scope indication information indicates an applicable scope of the second affinity rule.

10. A network functions virtualization orchestrator (NFVO) device, comprising:

memory, configured to store computer executable program code; and at least one processor, coupled to the memory, wherein the program code comprises instructions, and when the at least one processor executes the instructions, the instructions enables the NFVO device to perform the following operations:

receiving an instantiation request of a network service (NS) from an operations support system or business support system (OSS/BSS), wherein the instantiation request comprises affinity information indicating affinity or anti-affinity between a virtualized network function (VNF) instance of the NS and an existing VNF instance, wherein the affinity information has a VNF instance granularity, wherein the affinity information is associated with an identifier of the existing VNF instance and an identifier of a virtualized network function descriptor (VNFD), and wherein the VNF instance of the NS is instantiated according to the VNFD;

determining a target network service descriptor (NSD) according to a target NSD identifier (NSD ID) associated with the instantiation request;

determining multiple pieces of VNF instance requirement information required for instantiation of the VNF instance by parsing the target NSD, wherein at least one piece of VNF instance requirement information comprises one VNFD identifier (VNFD ID) and a deployment specification corresponding to the VNFD ID;

determining a first affinity rule for each piece of VNF instance requirement information of the multiple pieces of VNF instance requirement information according to the affinity information; and instantiating the NS according to the first affinity rule for each piece of VNF instance requirement information.

11. The NFVO device according to claim 10, wherein: the affinity information is a second affinity rule, wherein the second affinity rule comprises at least one of rule indication information, an affinity object identifier, or scope indication information.

12. The NFVO device according to claim 11, wherein the rule indication information indicates that the second affinity rule is an affinity rule or an anti-affinity rule.

13. The NFVO device according to claim 11, wherein the affinity object identifier identifies an action object of the second affinity rule, and the affinity object identifier comprises the identifier of the existing VNF instance and the identifier of the VNFD.

14. The NFVO device according to claim 11, wherein the scope indication information indicates an applicable scope of the second affinity rule.

15. A operations support system or business support system (OSS/BSS), comprising:

a memory, configured to store computer executable program code; and at least one processor, coupled to the memory, wherein the program code comprises instructions, and when the at least one processor executes the instructions, the instructions enable the OSS/BSS to perform the following operations:

obtaining affinity information, wherein the affinity information indicates affinity or anti-affinity between a virtualized network function (VNF) instance of a network service (NS) and an existing VNF instance, wherein the affinity information has a VNF instance granularity, wherein the affinity information is associated with an identifier of the existing VNF instance and an identifier of a virtualized network function descriptor (VNFD), and wherein the VNF instance of the NS is instantiated according to the VNFD; and sending an instantiation request of the NS to a network functions virtualization orchestrator (NFVO) device, wherein the instantiation request comprises the affinity information, wherein sending the instantiation request causes the NFVO device to:

determine a target network service descriptor (NSD) according to a target NSD identifier (NSD ID) associated with the instantiation request, to determining, by the NFVO, multiple pieces of VNF instance requirement information required for instantiation of the VNF instance by parsing the target NSD, wherein at least one piece of VNF instance requirement information comprises one VNFD identifier (VNFD ID) and a deployment specification corresponding to the VNFD ID;

determine a first affinity rule for each piece of VNF instance requirement information of the multiple pieces of VNF instance requirement information according to the affinity information; and instantiate the NS according to the first affinity rule for each piece of VNF instance requirement information.

16. The OSS/BSS according to claim 15, wherein the affinity information is a second affinity rule, wherein the second affinity rule comprises at least one of rule indication information, an affinity object identifier, or scope indication information.

17. The OSS/BSS according to claim 16, wherein the affinity object identifier identifies an action object of the second affinity rule, and the affinity object identifier comprises the identifier of the existing VNF instance and the identifier of the VNFD.

18. The OSS/BSS according to claim 16, wherein the scope indication information indicates an applicable scope of the second affinity rule.

19. The method according to claim 6, wherein the instantiation request of the NS is sent to the NFVO device via an OS-MA-NFVO interface between the OSS/BSS and the NFVO device.

20. The OSS/BSS according to claim 15, wherein the instantiation request of the NS is sent to the NFVO device via an OS-MA-NFVO interface between the OSS/BSS and the NFVO device.

* * * * *